United States Patent
Masuda et al.

(10) Patent No.: US 10,376,975 B2
(45) Date of Patent: Aug. 13, 2019

(54) WIRE ELECTRIC DISCHARGE MACHINE WITH TENSION MONITORING FUNCTION

(71) Applicant: FANUC Corporation, Yamanashi (JP)

(72) Inventors: Masashi Masuda, Yamanashi (JP); Akiyoshi Kawahara, Yamanashi (JP); Yasuo Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/979,500

(22) Filed: Dec. 27, 2015

(65) Prior Publication Data
US 2016/0184911 A1 Jun. 30, 2016

(30) Foreign Application Priority Data
Dec. 26, 2014 (JP) ................ 2014-264795

(51) Int. Cl.
*B23H 1/02* (2006.01)
*B23H 1/10* (2006.01)
*B23H 7/10* (2006.01)

(52) U.S. Cl.
CPC ............ *B23H 1/02* (2013.01); *B23H 1/10* (2013.01); *B23H 7/104* (2013.01); *G05B 2219/45043* (2013.01)

(58) Field of Classification Search
CPC . B23H 1/02; B23H 1/10; B23H 1/022; B23H 7/104; B23H 7/10; B23H 9/00; G05B 2219/45043
(Continued)

(56) References Cited

U.S. PATENT DOCUMENTS 4,298,781 A * 11/1981 Inoue ............... B23H 7/104
                                        219/69.12
5,421,534 A *  6/1995 Arnold ............ B65H 59/16
                                        226/42
(Continued)

FOREIGN PATENT DOCUMENTS

EP       0463178 A1    1/1992
JP       3-213215 A    9/1991
(Continued)

OTHER PUBLICATIONS

Extended European Search Report in EP Application No. 15200642.5, dated May 9, 2016.
(Continued)

*Primary Examiner* — Dana Ross
*Assistant Examiner* — Joseph M Baillargeon
(74) *Attorney, Agent, or Firm* — Hauptman Ham, LLP (57) ABSTRACT

A wire electric discharge machine with tension monitoring function comprising a tension generation unit configured to generate tension in the wire electrode, a first tension measurement unit set on the wire electrode and configured to measure tension, and a tension control unit configured to feedback tension value measured by the first tension measurement unit and output tension command value to the tension generation unit such that the tension value is equal to a target value, wherein a warning signal is configured to be generated when the tension command value output by the tension control unit is not within a set range corresponding to the target value of the tension.

4 Claims, 6 Drawing Sheets

(58) Field of Classification Search
USPC ..... 219/69.12, 69.13, 69.17; 29/240, 407.02,
29/407.03, 868, 869, 825, 424, 469,
29/525.02, 525.06, 745, 765
See application file for complete search history.

(56) References Cited

U.S. PATENT DOCUMENTS

| | | | | |
|---|---|---|---|---|
| 6,028,282 | A * | 2/2000 | Toyonaga | B23H 7/104 |
| | | | | 219/69.12 |
| 6,326,577 | B1 * | 12/2001 | Toyonaga | B23H 7/104 |
| | | | | 219/69.12 |
| 9,663,321 | B2 * | 5/2017 | Barea | B65H 59/388 |
| 2012/0109379 | A1 * | 5/2012 | Abdallah | B25J 15/0009 |
| | | | | 700/260 |
| 2013/0240486 | A1 * | 9/2013 | Yamada | B23H 7/104 |
| | | | | 219/69.12 |
| 2015/0212523 | A1 | 7/2015 | Wolf et al. | |
| 2015/0290733 | A1 | 10/2015 | Nakagawa | |
| 2016/0025529 | A1 * | 1/2016 | Astegher | G01L 19/0092 |
| | | | | 73/1.15 |

FOREIGN PATENT DOCUMENTS

| | | | |
|---|---|---|---|
| JP | 4-305794 | A | 10/1992 |
| JP | 2003-266247 | A | 9/2003 |
| KR | 100595701 | B1 * | 6/2006 |
| WO | 2013/174751 | A2 | 11/2013 |

OTHER PUBLICATIONS

Office Action in JP Application No. 2014-264795, dated Mar. 28, 2017.

* cited by examiner

WIRE ELECTRIC DISCHARGE MACHINE WITH TENSION MONITORING FUNCTION

RELATED APPLICATIONS

The present application claims priority to Japanese Application Number 2014-264795, filed Dec. 26, 2014, the disclosure of which is hereby incorporated by reference herein in its entirety.

BACKGROUND OF THE INVENTION

1. Field of the Invention

The present invention relates to a wire electric discharge machine for monitoring change of tension of wire by aged deterioration, lifetime, and the like.

2. Description of the Related Art

It is of critical importance to control tension of wire according to required value. When the tension is too weak, the wire is bent causing deterioration of machining precision. When the tension is too strong, breakage of the wire during machining is increased causing deterioration in operation rate of the machine. The tension of the wire is generally adjusted at the time of shipment, but long time use sometimes causes change of the tension value. In this case, malfunction as mentioned above is generated, to be a critical problem.

For this reason, some trials are performed to keep the tension of the wire regardless of deterioration of the machine. Japanese Patent Laid-Open No. 2003-266247 discloses a prior art to keep the tension to the wire to be constant. To quote from the Japanese Patent Laid-Open No. 2003-266247, a tension control signal is obtained by differential amplification of a tension detection signal and a tension command signal which is generated based on a tension set value and a tension control start signal. A signal obtained by differential amplification of a wire speed command signal and a speed detection signal is added to the tension control signal, and the result is given to a servo driver of a brake motor as an electric current command. An initial value of a wire electrode at start of tension control is set to be the tension command signal, and the value is controlled to reach the tension set value according to time width from the start of tension control and an increase pattern set in advance.

The tension is controlled to keep constant value based on the technique described above. Machining is immediately stopped in general, when feedback control fails by trouble of a tension generation system or a tension measurement system, or when the feedback control is expected to be failed.

Considering the above problem, in Japanese Patent Laid-Open No. 3-213215, a tension target value and a detected tension value are compared by a comparator to obtain deviation thereof, and alarm message is displayed when the deviation is beyond a tolerance range. Thus, a means for detecting failure to achieve target tension value by trouble of the tension generation device (a brake apparatus) or by deterioration caused by the end of a product lifetime, is provided.

However, in the technique disclosed in the Japanese Patent Laid-Open No. 3-213215, failure of the machine can not be determined before complete failure of the feedback control, since abnormality is detected by monitoring the deviation. This means that, the technique has a problem that defective rate of the processing is increased since the failure can not be detected in an early stage.

As an example, a case in which movement of a rotation part of the tension measurement device becomes slow by deterioration over time or the like, will be considered. As another example, a case in which slippage is generated in a feed roller, which is a component of the tension generation system, by frictional wear. When the feedback control of the tension is kept, a case in which the failure can not be determined is assumed to occur. The machine is in a state where the feedback control fails in the former case, while in a state where the feedback control itself has no abnormality in the latter case.

SUMMARY OF THE INVENTION

In view of the above-described problems in the prior art techniques, an object of the present invention is accordingly to provide a wire electric discharge machine capable of detecting abnormality of a tension generation unit or a tension measurement unit in an early stage, in a state where feedback control is continued.

A wire electric discharge machine with tension monitoring function according to the present invention is configured to relatively move a wire electrode and a workpiece, apply voltage to electrode gap formed between the wire electrode and the workpiece, machine the workpiece by removal processing, the wire electric discharge machine with tension monitoring function including a tension generation unit configured to generate tension in the wire electrode, a first tension measurement unit fixed on the wire electrode and configured to measure tension, and a tension control unit configured to feedback tension value measured by the first tension measurement unit and output tension command value to the tension generation unit such that the tension value is equal to target value, wherein warning signal is configured to be generated when the tension command value output by the tension control unit is not within a set range corresponding to the target value of the tension.

At least one of displaying of warning and stopping of machining may be performed when the warning signal is received.

The wire electric discharge machine with tension monitoring function may include a second tension measurement unit movably mounted on the wire electrode and configured to measure tension of the wire electrode, wherein machining is restarted when deviation of value measured by the first tension measurement unit and the second tension measurement unit is within predetermined value.

The second tension measurement unit may be inserted by a robot.

The present invention, with the above configuration, can provide a wire electric discharge machine capable of detecting abnormality of a tension generation unit or a tension measurement unit in an early stage, in a state where feedback control is continued.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
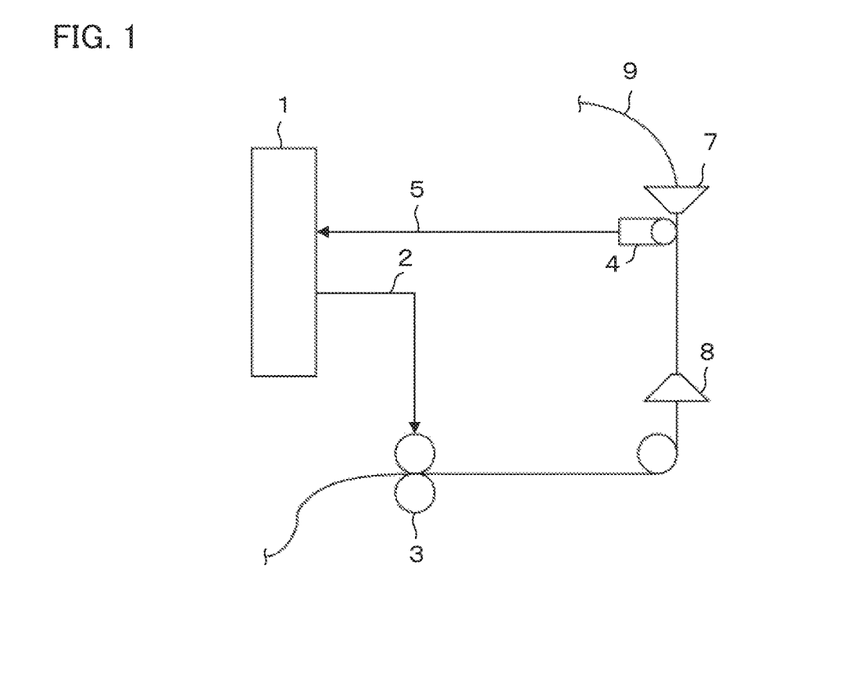
FIG. 1 is a diagram illustrating a tension monitoring system.
Figure 2:
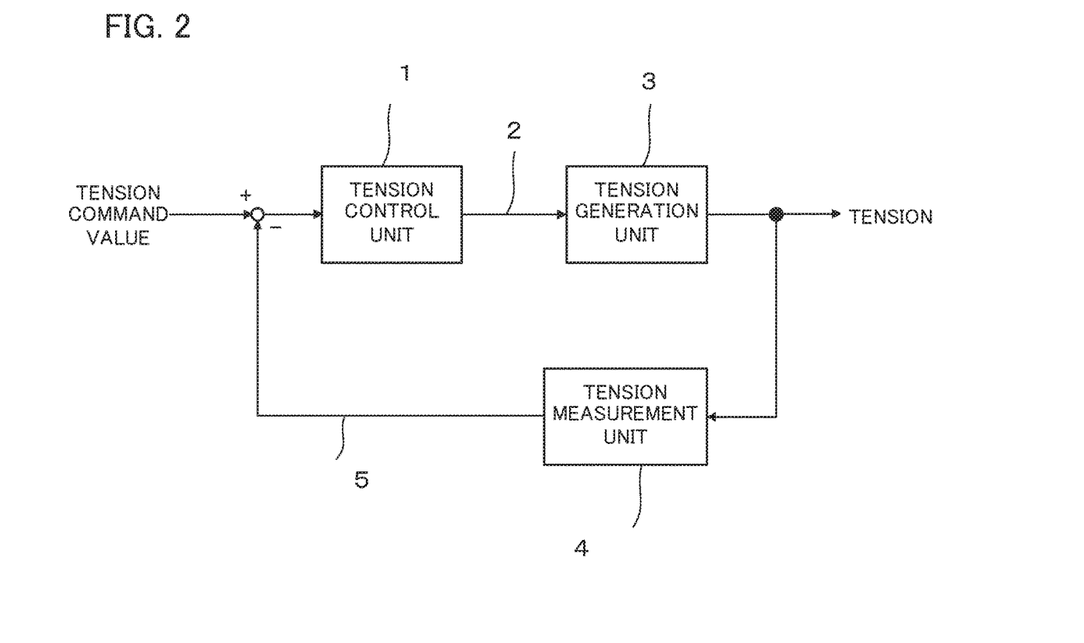
FIG. 2 is a block diagram illustrating configuration for adjustment of tension.

FIG. 1 is a diagram illustrating a tension monitoring system. FIG. 2 is a block diagram illustrating configuration for adjustment of tension. As shown in FIG. 1, a wire electric discharge machine stretches a wire electrode 9 between an upper guide 7 and a lower guide 8 of a pair of guides, makes a tension generation unit 3 make tension in the wire electrode 9, includes a tension controller 1 and has function of sending a first measured tension value 5, obtained from a tension measurement device 4 on a wire, to the tension controller 1. The tension controller 1, as a tension control unit, sends a tension command value 2 to the tension generation unit 3 based on a tension target value commanded by a host control device not shown in the figure.

Figure 3:
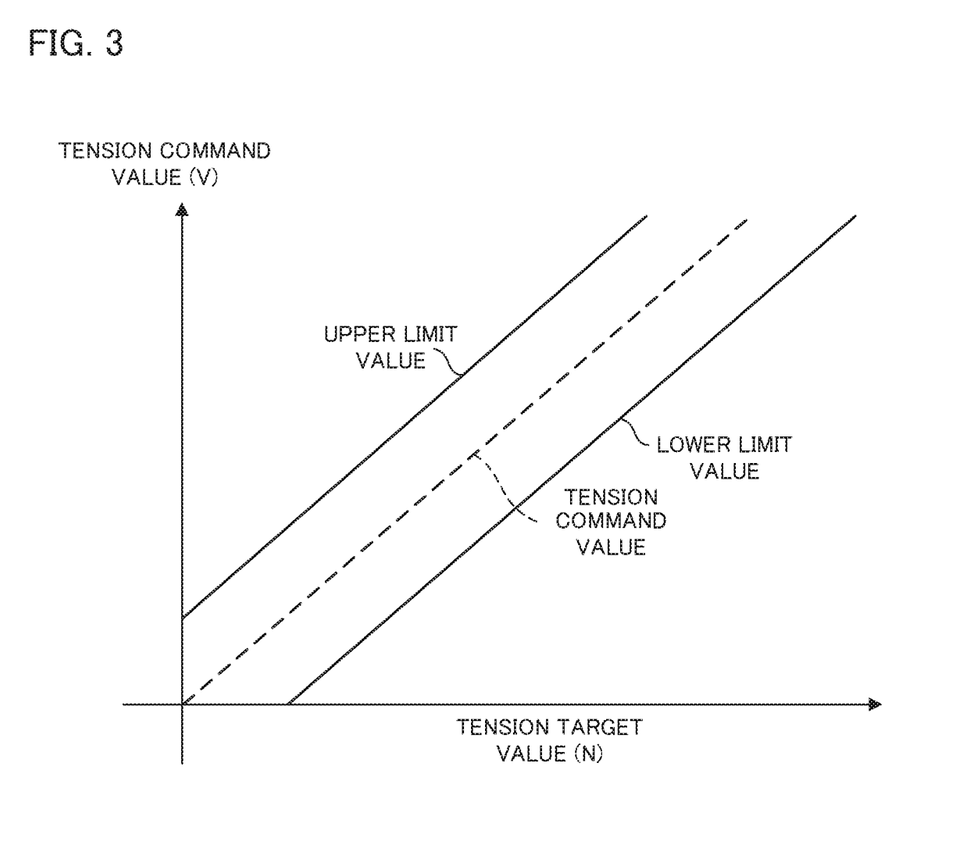
FIG. 3 is a diagram illustrating that alarm signal is generated when tension command value deviates from range between upper limit value and lower limit value centered at estimated command value.

FIG. 3 is a diagram illustrating that alarm signal is generated when tension command value deviates from range between an upper limit value and a lower limit value centered at an estimated command value. The tension controller 1 set an upper limit value and a lower limit value for the tension command value calculated from the tension target value commanded by the host control device, and generates alarm signal when the actual tension command value 2 deviates the range between the upper limit value and the lower limit value. When the tension command value 2 sent from the tension controller 1 deviates from the set range corresponding to the tension target value, for example, when the tension command value deviates from the target command value by 10%, the alarm signal is generated such that abnormality of the tension generation unit 3 or the tension measurement unit 4 can be detected in an early stage, in a state where feedback control is continued. In an embodiment, the tension command value, which is calculated based on the target command value sent from the tension controller 1, is stored in the machine in advance, and is compared with the actual tension command value 2 in the tension controller 1, and the alarm signal is generated when the deviation become greater than a predetermined value, such that abnormality can be detected before the feedback control fails.

Figure 4:
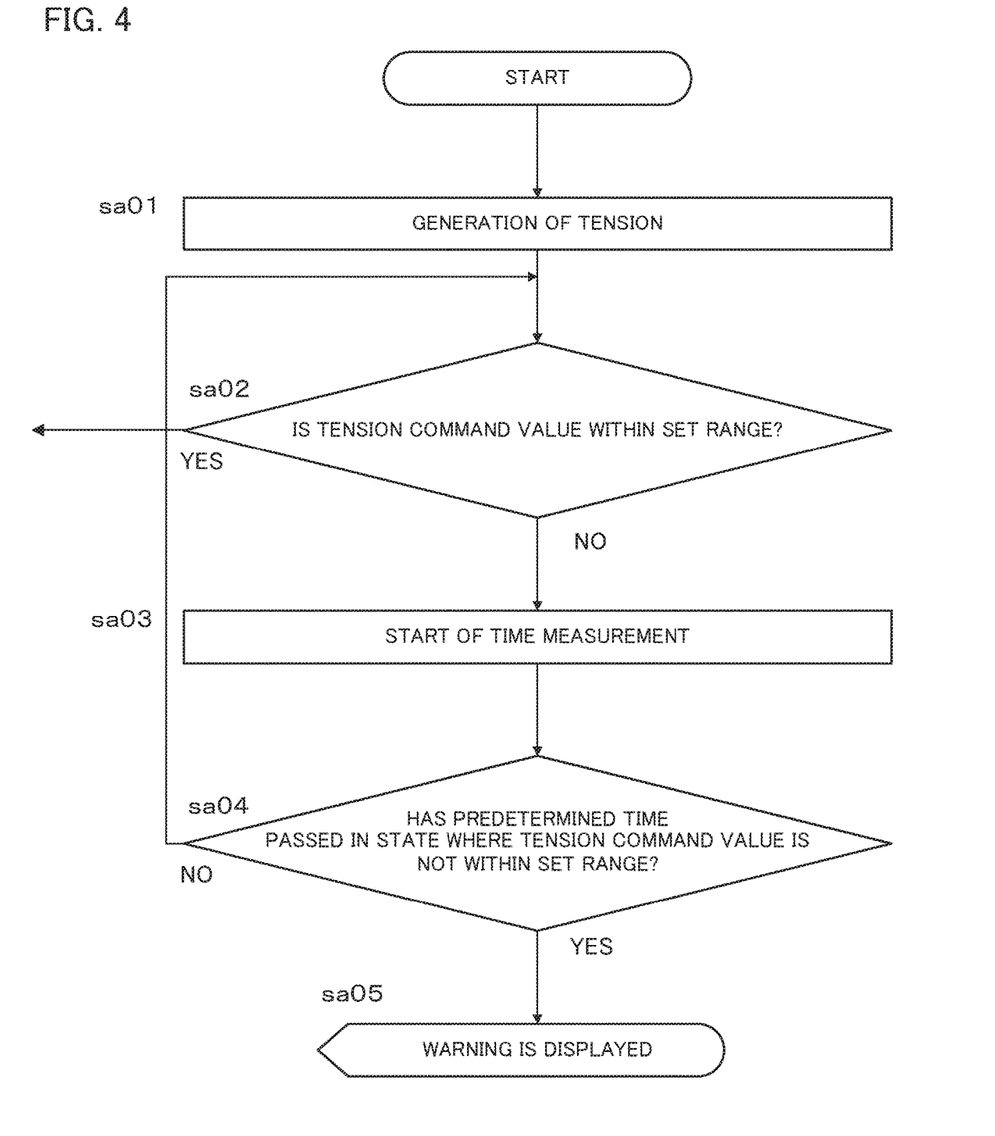
FIG. 4 is a flowchart illustrating control in configuration for adjustment of tension shown in FIG. 3.

FIG. 4 is a flowchart illustrating control in configuration for adjustment of tension shown in FIG. 3. Each step will be described below.

[Step sa01] The tension generation unit 3 is driven using the tension command value 2 to generate tension.

[Step sa02] The process proceeds to Step sa03 when the tension command value 2 deviates from a set value range (NO). It is determined whether the tension command value 2 is within the set value range while the tension command value is within the set value range.

[Step sa03] Measurement of elapsed time is started.

[Step sa04] It is determined whether a predetermined time elapsed in a state where the tension command value 2 is not within the set range. The process proceeds to Step sa05 when the predetermined time elapsed (YES), while the process returns to Step sa02 and continues when the predetermined time did not elapse (NO).

[Step sa05] Warning is displayed.

It is assumed that load becomes heavier by deterioration of the tension generation unit 3 or the tension measurement unit 4 or the like when the tension command value 2 sent from the tension controller (a tension control unit) 1 is high, while it is assumed that the tension generation unit 3 or the tension measurement unit 4 is broken when the tension command value 2 is low.

Figure 5:
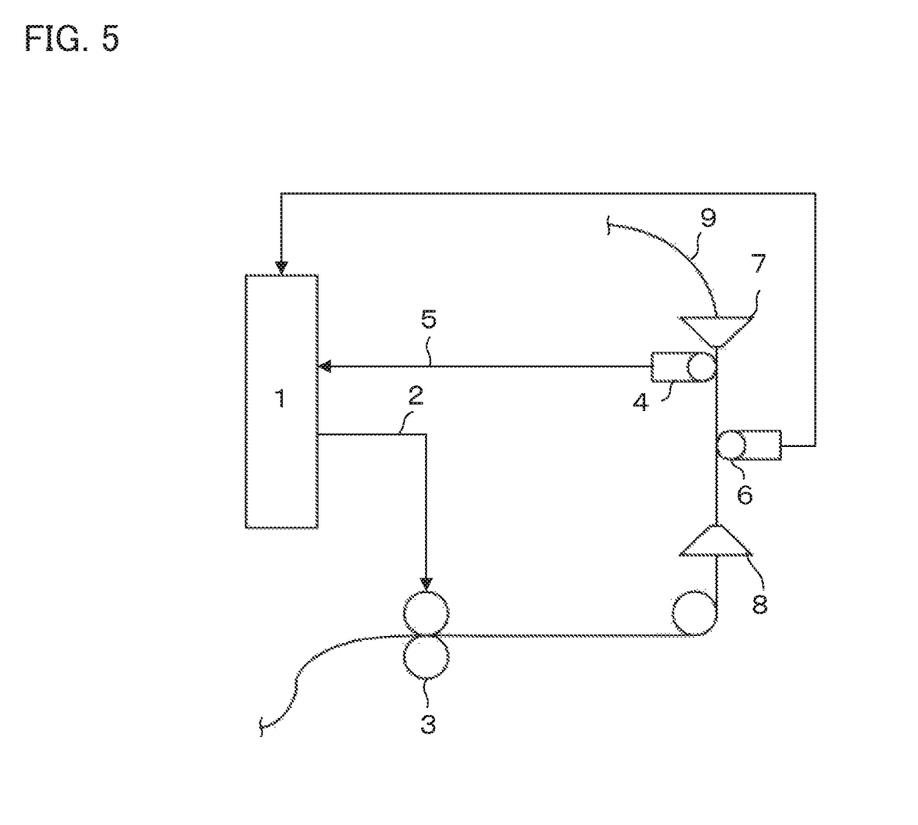
FIG. 5 is a diagram illustrating another tension monitoring system.

FIG. 5 is a diagram illustrating another tension monitoring system, according to an embodiment of the present invention. It is not clear that which of the tension generation unit 3 or the tension measurement unit 4 is broken, when the tension controller (a tension control unit) detects abnormality. That is, it can not be determined which of the tension generation unit 3 or the tension measurement unit 4 has a problem when the tension controller (a tension control unit) 1 outputs the alarm signal.

When the tension is measured again by a second tension measurement unit, that is, a tension measurement unit 6 in FIG. 5, it can be determined which of the tension generation unit 3 or the tension measurement unit 4 is broken. Then machining is immediately stopped when the tension measurement unit 4 is broken, while the machining is continued when the tension generation unit 3 is broken and the feedback control does not fail. Thus, the wire electric discharge machine can machine with high precision for longer time compared to the prior art. It should be noted that it is assumed that the second tension measurement unit is calibrated.

Increased continued operation time of the wire electric discharge machine is expected, by performing displaying of waring or stopping of machining on receiving the alarm signal, inserting the tension measurement unit 6 as the second tension measurement unit on the wire electrode, restarting the machining when deviation between the first measured tension value of the tension measurement unit 4 and the second measured tension value of the tension measurement unit 6 is within a set range.

Figure 6:
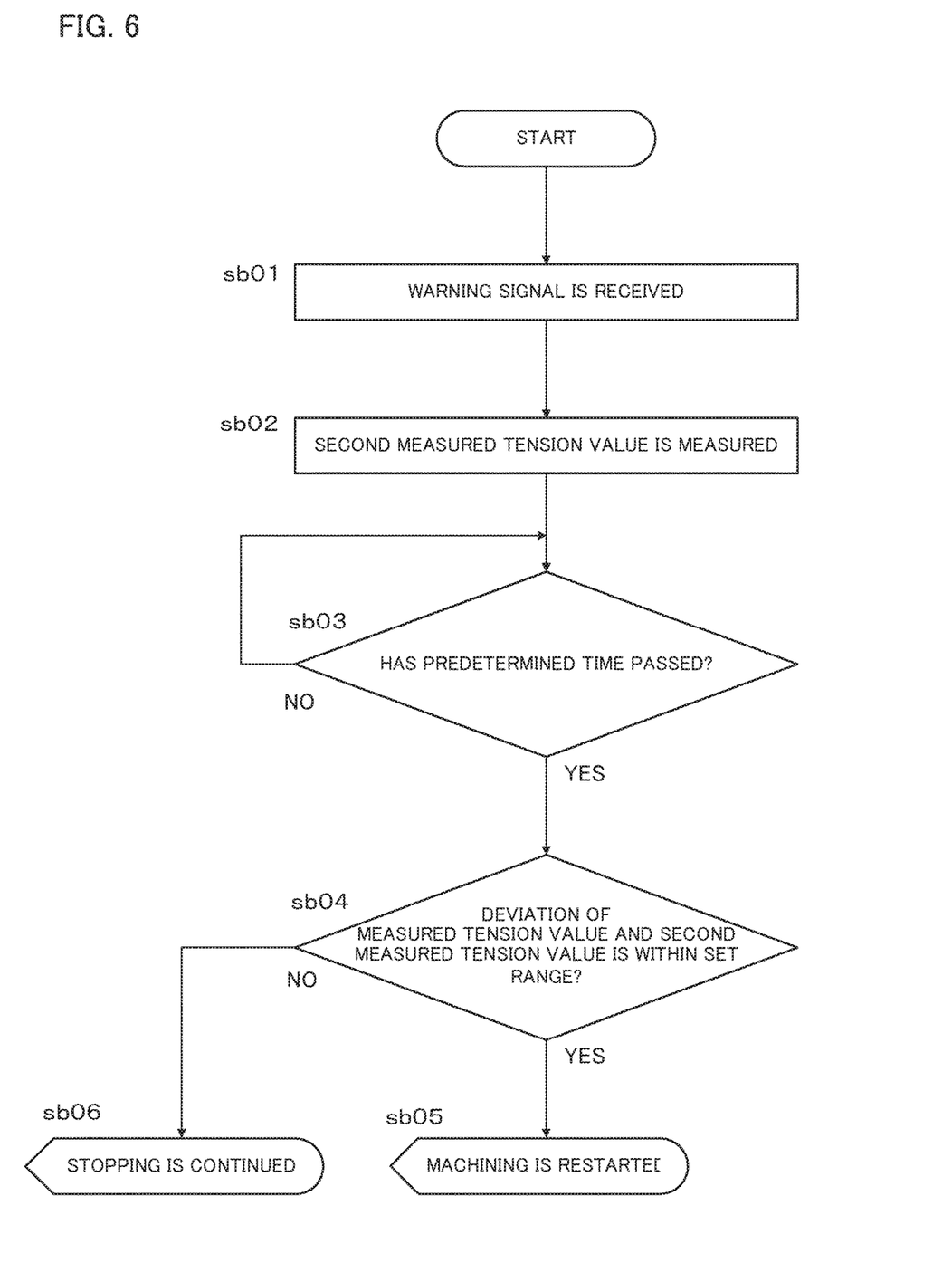
FIG. 6 is a flowchart illustrating control in configuration for adjustment of tension shown in FIG. 5.

FIG. 6 is a flowchart illustrating control to be executed in the tension controller 1 after the warning is received. Each step will be described below.

[Step sb01] The alarm signal is received.

[Step sb02] The second measured tension value is obtained by measuring.

[Step sb03] It is determined whether a predetermined time elapsed or not. The process proceeds to Step sb04 when the predetermined time elapsed (YES), while the process proceeds to Step sb04 after elapse of the predetermined time is waited.

[Step sb04] It is determined whether the deviation between the first measured tension value and the second measured tension value is within the set range or not. The process proceeds to Step sb05 when the deviation is within the set range (YES), while the process proceeds to Step sb06 when the deviation is not within the set range (NO).

[Step sb05] The machining is restarted.

[Step sb06] Stopping is continued.

As mentioned above, the first measured tension value by the first tension measurement unit and the second measured tension value by the second tension measurement unit are acquired by the tension controller 1 to calculate the deviation. It can be determined that no abnormality occurs in the first tension measurement unit (the tension measurement unit 4), that is, the tension generation unit 3 is broken, when the deviation is less than the predetermined value. In this case, since the first measured tension value indicates the true tension value, deterioration of machining precision is not caused even when the machining is restarted. In addition to that, since the tension generation unit 3 is burdened than necessary, notification the operator of the portent of the failure by displaying warning lengthen the life of the device.

In addition to that, measured tension value with high precision can be obtained by inserting the tension measurement unit 6 as the second tension measurement unit using a robot 10 (refer to FIG. 7), since wobbling of location in space of the tension measurement unit 6 is suppressed. Here, the tension measurement units 4, 6 as the first and the second tension measurement units are assumed to measure tension corresponding to displacement amount of a roller when the roller set on the wire is pushed by the wire electrode 9, as a tension sensor generally used.

Figure 7:
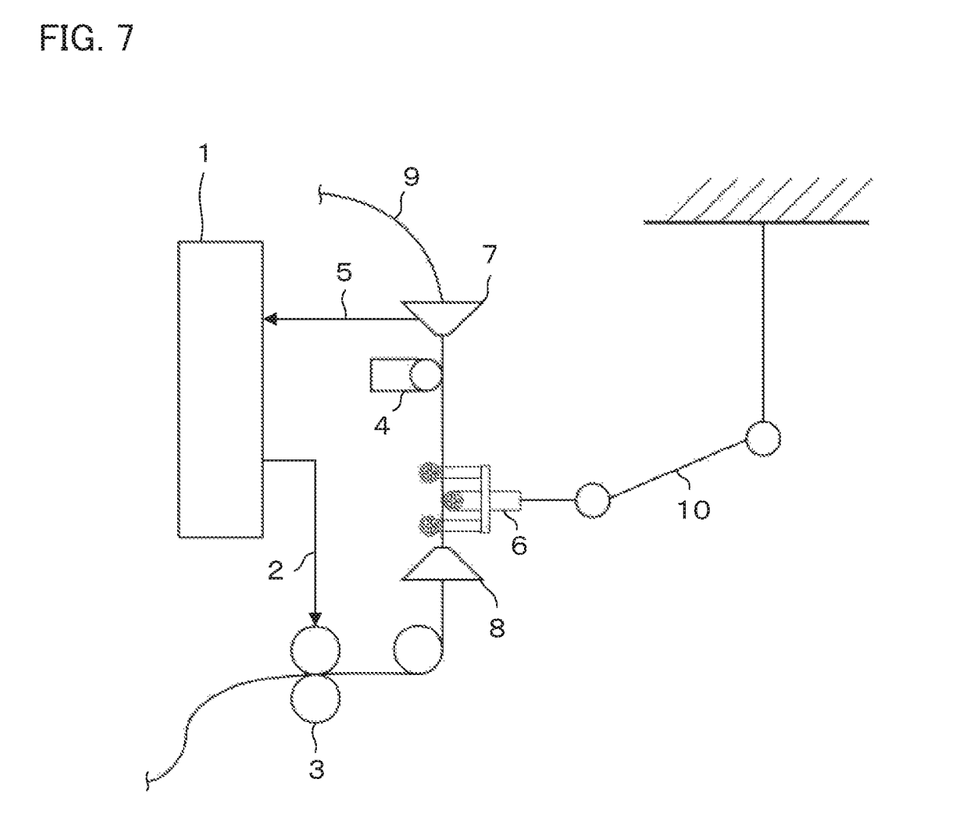
FIG. 7 is a diagram showing configuration of tension monitoring function having configuration for adjustment of tension equipped with a robot device.

FIG. 7 is a diagram showing configuration of tension monitoring function having configuration for adjustment of tension equipped with a robot device.

Furthermore, the second tension measurement unit, as shown in FIG. 7, for example, makes the robot which attaches and detaches a workpiece temporarily handle the tension measurement unit to insert the tension measurement unit on the wire. In addition to that, when necessary, a vision sensor may confirm that the wire is correctly incorporated to the tension measurement unit.

With the configuration, false detection rate by the wobbling of the tension measurement unit can be decreased and continuous operation for long time night and day with high precision is enabled.

The invention claimed is:

1. A wire electric discharge machine with a tension monitoring function, the wire electric discharge machine configured to relatively move a wire electrode and a workpiece while applying voltage to an electrode gap formed between the wire electrode and the workpiece in machining the workpiece by removal processing, the wire electric discharge machine comprising:
   a tension generation device configured to stretch the wire electrode between a pair of guides, and generate tension in the wire electrode;
   a first tension measurement device fixed on the wire electrode between the pair of guides, the first tension measurement device being configured to measure the tension of the wire electrode; and
   a tension controller connected to the first tension measurement device and to the tension generation device, the tension controller being configured to
      receive a tension value measured by the first tension measurement device,
      output a tension command value to the tension generation device such that the tension value is equal to a target value, and
      preset a range of tension of the wire electrode, the range corresponding to the target value,
      wherein the tension controller is configured to generate a warning signal in response to the tension command value, which is output in response to the tension value actually measured by the first tension measurement device, being not within the range of tension preset by the tension controller,
   wherein the wire electric discharge machine further comprises:
   a robot; and
   a second tension measurement device movably mounted on the wire electrode between the pair of guides, and the second tension measurement device being configured to measure the tension of the wire electrode,
   wherein the tension controller is further configured to determine whether the tension generation device or the first tension measurement device is broken on the basis of the tension of the wire electrode measured by the second tension measurement device, and
   wherein, in response to the warning signal,
   the robot moves the second tension measurement device to the wire electrode and mounts the second tension measurement device on the wire electrode between the pair of guides, and
   the second tension measurement device measures the tension of the wire electrode while the machining is stopped.

2. The wire electric discharge machine according to claim 1, wherein displaying of the warning signal is performed in response to receipt of the warning signal.

3. The wire electric discharge machine according to claim 1, wherein
   the machining is restarted in response to a deviation between (i) the tension value measured by the first tension measurement device and (ii) a tension value measured by the second tension measurement device being within a predetermined range.

4. The wire electric discharge machine according to claim 1, wherein the machining is stopped when the tension controller determines that the first tension measurement device is broken, and the machining is continued when the tension controller determines that the tension generation device is broken.

* * * * *